United States Patent [19]

Sugiura et al.

[11] Patent Number: 4,863,658

[45] Date of Patent: Sep. 5, 1989

[54] ALUMINUM NITRIDE CERAMIC SUBSTRATE FOR COPPER AND METHOD FOR PRODUCTION THEREOF

[75] Inventors: Yasuyuki Sugiura; Hobuyuki Mizunoya, both of Yokohama, Japan

[73] Assignee: Kabushiki Kaisha Toshiba, Kawasaki, Japan

[21] Appl. No.: 212,130

[22] Filed: Jun. 28, 1988

Related U.S. Application Data

[63] Continuation of Ser. No. 780,818, Sep. 27, 1985, abandoned.

[30] Foreign Application Priority Data

Sep. 30, 1984 [JP] Japan ............................... 59-204709
Nov. 9, 1984 [JP] Japan ............................... 59-235067
Dec. 28, 1984 [JP] Japan ............................... 59-277702

[51] Int. Cl.$^4$ ............................................ C04B 35/58
[52] U.S. Cl. ....................................... 264/65; 264/57; 264/58; 264/67
[58] Field of Search ....................... 264/57, 58, 67, 65

[56] References Cited

U.S. PATENT DOCUMENTS

| | | | |
|---|---|---|---|
| 3,179,724 | 4/1965 | Jones | 264/58 |
| 3,283,044 | 11/1966 | Brown et al. | 264/58 |
| 3,287,478 | 11/1966 | Pallen et al. | 264/67 |
| 3,792,139 | 2/1974 | Weinstein | 264/58 |
| 4,340,436 | 7/1982 | Dubetsky | 264/58 |
| 4,369,154 | 1/1983 | Dougherty | 264/67 |
| 4,435,513 | 3/1984 | Komeya et al. | 501/96 |
| 4,579,705 | 1/1986 | Matsuoka et al. | 264/67 |
| 4,591,537 | 5/1986 | Aldinger et al. | 428/698 |

*Primary Examiner*—James Derrington
*Attorney, Agent, or Firm*—Finnegan, Henderson, Farabow, Garrett, & Dunner

[57] ABSTRACT

When molded plates of aluminum nitride obtained by molding a ceramic powder formed preponderantly of aluminum nitride powder are superposed on a support base with a ceramic powder interposed between the support base and the superposed plates and between the superposed plates and are fired in a non-oxidative atmosphere, the sintered plates consequently produced are prevented from sustaining crack or fracture.

When warped and undulated sintered plates of aluminum nitride are superposed on a support base with a ceramic powder interposed between the support base and the superposed plates and between the superposed plates and are heated in a non-oxidative atmosphere, the heated plates are relieved of warp and undulation.

The sintered plates of aluminum nitride are enabled to acquire improved adhesiveness to a metal film or foil when they are subjected to a heat treatment adapted to reduce the surface roughness to or below 10 $\mu$m (Rmax).

2 Claims, No Drawings

ALUMINUM NITRIDE CERAMIC SUBSTRATE FOR COPPER AND METHOD FOR PRODUCTION THEREOF

This is a continuation of application Ser. No. 780,818 filed Sept. 27, 1985.

FIELD OF THE INVENTION AND RELATED ART STATEMENT

This invention relates to a method for the production of aluminum nitride ceramic plate, and more particularly to a method for the production of a thin aluminum nitride ceramic plate.

Aluminum nitride ceramics are non-oxide ceramics possessed of a high electric insulating property and a high thermal conductivity. Studies are now under way on the feasibility of utility of aluminum nitride ceramics as materials for various parts such as substrates for power transistor modules.

As one means of producing aluminum nitride ceramics, such as aluminum nitride ceramics in the form of thin plates for use as substrates, for example, the method which comprises mixing aluminum nitride power with a sintering aid and a binder, molding the resultant mixture in the form of plates 0.3 to 2.0 mm in thickness, setting the molded plates of mixture in a place one each in a plurality of superposed ceramic support bases, and firing them is much in vogue at present.

This method, however, has the disadvantage that the molded plates and the support bases are liable to adhere to each other by the heat and pressure applied during the course of the firing and the resultant sintered plates sustain cracks and fractures.

This conventional method is further disadvantageous in respect that the space factor is poor because the molded plates are fired as set in place one each on the support bases, the workability is poor because the support bases add a great deal to the total weight, and the thermal efficiency is poor because the applied heat is partly wasted in elevating temperature of he support bases. Incidentally, when the molded pieces of mixture have a small thickness falling on the order of 0.3 to 1.0 mm as in the case of substrates for power transistor modules, the molded pieces set in place one each on the support bases are liable to warp undulate. For this reason, the practice of superposing a plurality of sintered pieces resulting from the firing and heating them at elevated temperatures thereby enabling them to mend their deformed shape under their own weight or under a separately applied weight has found widepread acceptance.

Again in this case, the sintered pieces are liable to adhere fast to each other at the elevated temperatures, frequently with the result that they sustain cracks and fractures. Particularly when the sintered pieces happen to be in the form of thin plates and are highly susceptible to cracks and fractures, this mending method proves deficient in operational efficiency because the sintered pieces must be mended in shape one by one.

Further in the case of thin plates of sintered aluminum nitride to be used as substrates, in spite of the elimination of warp and undulation, there still persists the possibility that when the thin plates are very rough in surface, their surface will offer insufficient adhesive strength to a thin metallic film or foil to be applied thereon for purpose of the formation of a conductor pattern and the applied metallic film or foil will peel partially to impair the electric properties or degrade the fine line property of the produced device.

OBJECT AND SUMMARY OF THE INVENTION

The first object of this invention, therefore, is to provide a method for the production of sintered aluminum nitride plates, which enables a plurality of plates of aluminum nitride ceramics to be superposed without the use of any supporting base and burnt.

The second object of this invention is to provide a method for the production of sintered aluminum nitride plates, which enables a plurality of sintered aluminum nitride plates to be superposed without mutual adhesion and to be efficiently corrected.

The third object of this invention is to provide a method for the production of sintered aluminum nitride plates, which enables the intimate adhesiveness of a conductor foil or conductor film for application to the plates as substrates to be improved by subjecting the plates of sintered aluminum nitride to a surface treatment adapted to lower the surface roughness into a prescribed range.

DETAILED DESCRIPTION OF PREFERRED EMBODIMENTS

In the present invention, a ceramic powder consisting of at least 95%, preferably 96–99%, of aluminum nitride powder and not more than 5%, preferably 1–4 %, of a sintering aid is combined with a binder such as paraffin and allyl type resin and optionally an organic solvent. The resultant mixture is molded in the form of plates not more than 2 mm, particularly 0.3–1 mm, in thickness by the press molding method, the slip casting method, the doctor blade method or some other proper molding method known to the art.

Examples of the aforementioned sintering aid include oxides of rare earth element such as yttrium oxide, oxides of aluminum, magnesium, calcium strontium, and barium.

Not more than 20 such molded plates of the mixture are superposed on a ceramic support base, with a ceramic powder of an average particle diameter of 1 to 50 $\mu$m interposed between the support base and the lowest molded plate and between the individual molded plates.

Examples of the aforementioned ceramic powder include boron nitride powder, aluminum nitride powder, and alumina powder. Among other ceramic powders cited above, the boron nitride powder proves particularly desirable. For the ceramic powder to fulfil its purpose advantageously, the grain size thereof is required to fall in the range of 1 to 50 $\mu$m, preferably 1 to 20 $\mu$m. This ceramic powder can be applied to the surface of the support base and on the surface of the molded plates of mixture by suspending the ceramic powder in an organic solvent such as acetone, alcohol, etc., and directly applying the resultant suspension on the surface by means of a spray, a brush, or a roll by dipping the surfaces in the suspention, or by simply sprinkling the supension on the surfaces. The deposition of the ceramic powder on the molded plates may be effected on both sides or on only one side. The layer ceramic powder deposited on the surface of the molded plates is desired to have a thicknbess of not less than 1 $\mu$m.

The plurality of molded plates of mixture are placed in an atmosphere formed of one more non-oxidative gases such as N and Ar or a vacuum atmosphere and burned at a temperature in the range of 1,600° to 1,850°

C., preferably 1,700° to 1,800° C., for a period of one to three hours, under appication of no pressure or under a load of not more than 400 kg/cm².

The sintered aluminum nitride plates consequently obtained experience virtually no occurrence of cracks or fractures because the superposed plates of mixture are effectively prevented from mutual fusion by the intervening ceramic powder during the course of the firing.

Then, the sintered plates of aluminum nitride obtained as described above are given a corrective treatment for the elimination of warp and undulation by the following method.

Five to ten such sintered plates of aluminum nitride are superposed on a support base, with another support base placed as a weight on the highest of the superposed plates. Optionally a plurality of sets of superposed plates are piled up, capped with a weight. The superposed sintered plates are placed in an atmosphere formed of one or more non-oxidative gases such as $N_2$ and Ar or in a vacuum atmosphere and heated therein for a period of 10 minutes to three hours under application of no pressure or under a load of not more than 400 kg/cm². For the purpose of preventing the sintered plates from mutual fusion and keeping grains from further growth, this heating is desired to be carried out at a temperature 50 to 100 Centigrade degrees lower than the temperature at which the molded plates of alumina nitride were burned. Specifically, this temperature is desired to fall in the range of 1,500° to 1,800° C., for example.

The ceramic powder to be used for separating the sintered plates is the same as that which has been used for separating the molded plates. Further, the method by which the ceramic powder is interposed between the opposed surfaces is the same as that which has been used for the molded plates of aluminum nitride. For the ceramic powder to fulfil its purpose advantageously, the required to be not less than 1 $\mu$m.

The sintered aluminum nitride plates are honed with Alundum particles 100 to 1,000 mesh in grain size or ground with diamond particles 100 to 600 mesh in grain size to remove the ceramic powder adhered on the surface until the surface roughness is decreased to below 10 $\mu$m (in trerms of maximum height, Rmax).

The sintered aluminum nitride plates which have been obtained by the method described above optionally have their surface oxidized to be coated with a stable alumina layer 1 to 10 $\mu$m in thickness so as to facilitate adhesion thereto of a conductor foil or conductor film. This alumina layer can be formed by heating the surface in the air or some other oxidative atmosphere at a temperature in the range of 1,000° to 1,400° C. for a period of 0.5 to 10 hours.

The surface roughness which the sintered aluminum nitride plates are required to possess varies with the nature of the use for which the plates are intended. Properly, the surface roughness is not more than 5 $\mu$m where the plates are substrates for thick layers using Au, Ag/Pd, Cu, glass, and resistor; not more than 2 $\mu$m where the plates are substrates for thin layers using Cu, Tl, Ag, and Au; not more than 6 $\mu$m where the plates are substrates to which copper patterns are directly joined; and not more than 10 $\mu$m where the plates are substrates for structures. In the case of substrates for thickn layers, the surface roughness is desired to be not leas than 2 $\mu$m because excessively high smoothness results in loss of adhesive strength of layers.

Now, the present inventioin will be described below with reference to working examples.

EXAMPLE 1:

A mixture obtained by combining aluminum nitride powder containing 3% by weight of yttrium oxide with 7% by weight of acryl type resin as a binder and further adding thereto an organic solvent was molded by the doctor blade method to produce a thin plate 1 mm in thickness. Rectangular pieces 80×40 mm were punched out of the thin sheet and were degreased in a nitrogen atmosphere at amount 700° C. for one hour. Separately, 10 g of boron nitride powder having an average particle diameter of 3 $\mu$m was suspended in 100 cc of acetone. With a brush, the resultant suspension was applied to the surface of a support base made of aluminum nitride and the surface of the aforementioned rectangular pieces of aluminum nitride to form thereon a layer of boron nitride powder 15 $\mu$m in thickness.

Then, on the support base on which the boron nitride powder had been applied as described above, ten of the rectangular pieces of aluminum nitride ceramic mixture were superposed with the same boron nitride powder interposed between the superposed rectangular pieces. The superposed rectangular pieces were placed in a container of alumina and burned under atmospheric pressure of $N_2$ gas at 1,800° C. for two hours.

The sintered rectangular pieces consequently obtained were not fused with the support base or with one another and the boron nitride powder could be easily removed from the sintered rectangular pieces. The sintered rectangular pieces possessed a good surface shape showing no discernible sign of crack or warp.

EXAMPLE 2:

A mixture obtained by combining aluminum nitride powder containing 3% by weight of yttrium oxide with 7% by weight of acryl type resin as a binder was processed by following the procedure of Example 1, to give rise to rectangular pieces measuring 80 mm×40 mm×0.8 mm. These rectangular pieces were similarly degreased. Then, 20 such rectangular pieces were superposed in the same manner as in Example 1 and burned in an atmosphere of nitrogen gas at 1,800° C. for two hours. Part of the sintered rectangular pieces were found to be warped by a maximum size of about 2 mm in the direction of length. The sintered rectangular pieces which were warped were collected. Separately, 10 g of boron nitride powder about 400 mesh in grain size was suspended in 100 cc of acetone. The suspension was applied with a brush on the surface of a support base made of aluminum nitride and on the surface of the sintered rectangular pieces of aluminum nitride to form a layer of boron nitride powder about 1-10 $\mu$m in thickness.

Then, on the support base of ceramic on which the boron powder had been applied, 10 sintered rectangular pieces of aluminum nitride were superposed each in a total of five sets, with boron nitride powder interposed similarly between the opposed surfaces and support bases placed one each on the sets of superposed sintered rectangular pieces. The superposed rectangular pieces on the support base (about 0.5 kg) were placed in a container made of alumina and heated in nitrogen gas at about 1,700° C. for one hour to correct deformation. The sintered rectangular pieces after this heating had warp mended to flatness of not more than 80 $\mu$m. The corrected sintered pieces were not fused with the support base or with one another. The boron nitride powder could be easily removed from the sintered pieces.

EXAMPLE 3:

A mixture obtained by combining aluminum nitride powder having particle diameters of 1 to 2 μm and containing 3% of yttrium oxide with 7% of acryl type resin as a binder and adding thereto an organic solvent was molded in the form of a plate, degreased in nitrogen gas at about 700° C. for one hours in the same manner as in Example 1, fired under atmospheric pressure, subjected to honing to remove the ceramic powder from the surface and then heated in the air at about 1,200° C. for one hour to give rise to a flat alumina nitride type ceramic substrate having a stabilized alumina layer about 8 μm in thickness formed on the surface thereof and possessing a surface roughness of 5 μm (Rmax).

A thin copper sheet 0.3 mm in thickness was placed on the substrate and joined thereto at 1065°–1080° C. under application of heat to test the substrate for tight adhesiveness with the thin copper sheet, and electrical properties. Consequently, the adhesive strength to the cooper sheet was found to be about 2.5 kg/mm$^2$, and the electric resistance to be about 2.0 Ω-cm.

EXAMPLE 4:

A substrate was produced by following the procedure of Example 1, using aluminum nitride powder of particle diameters of 2.5 to 4 μm and 3% of yttrium oxide. The produced substrate had a surface roughness of 13 μm (Rmax). This substrate was honed with abrasive abour 600 mesh in grain size to reduced the surface roughness to 8 μm (Rmax). When a thin copper sheet was joined to this substrate by following the procedure of Example 3, the results were similarly satisfactory.

COMPARATIVE EXPERIMENT

When a thin copper sheet was joined similarly to Example 3 to the (oxidized) substrate of a surface roughness of 13 μm(Rmax) obtained in Example 4, it was not joined uniformly throughout the entire surface area. The copper sheet partly peeled from the substrate.

We claim:

1. A method for the production of an aluminum nitride ceramic substrate, characterized by subjecting sintered plates of aluminum nitride comprising not more than 5% of a sintering aid and the balance to make up 100% of aluminum nitride to a honing treatment to reduce the surface roughness of said sintering plate to or below 10 μm in terms of maximum height, Rmax, and heating said sintered plates to form an alumina layer thereon at a temperature in the range of 1,000° C. to 1,400° C. for 0.5 to 5 hours in an oxidizing atmosphere.

2. A method according to claim 1, wherein said honing is carried out by 100 to 600 mesh diamond particles.

* * * * *